July 23, 1940.  E. C. CORK ET AL  2,208,749
AERIAL SYSTEM
Filed Feb. 3, 1938   2 Sheets-Sheet 1
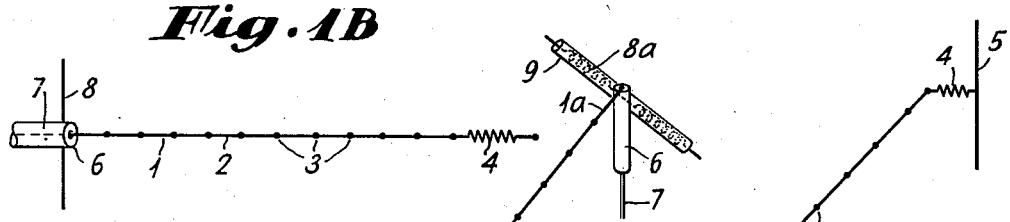
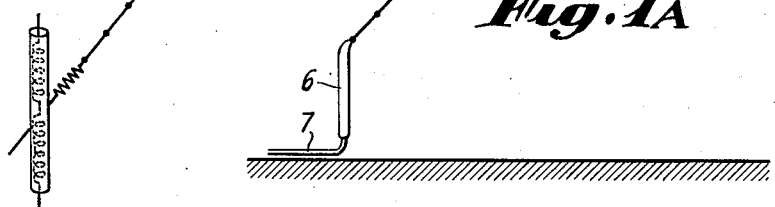
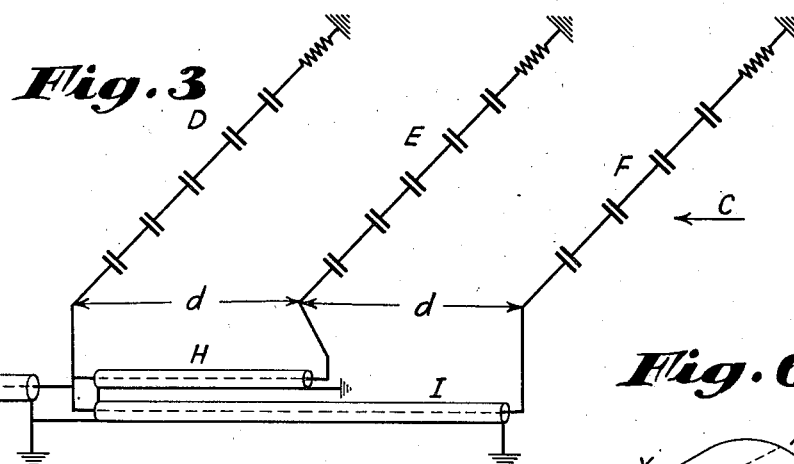
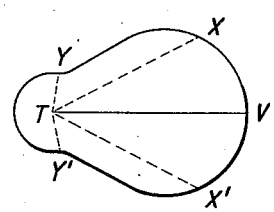
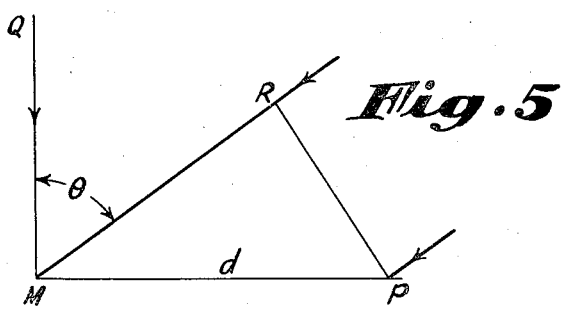
INVENTORS
EDWARD CECIL CORK
MICHAEL BOWMAN-MANIFOLD
BY JOSEPH LADE PAWSEY
ATTORNEY July 23, 1940.  E. C. CORK ET AL  2,208,749
AERIAL SYSTEM
Filed Feb. 3, 1938  2 Sheets-Sheet 2
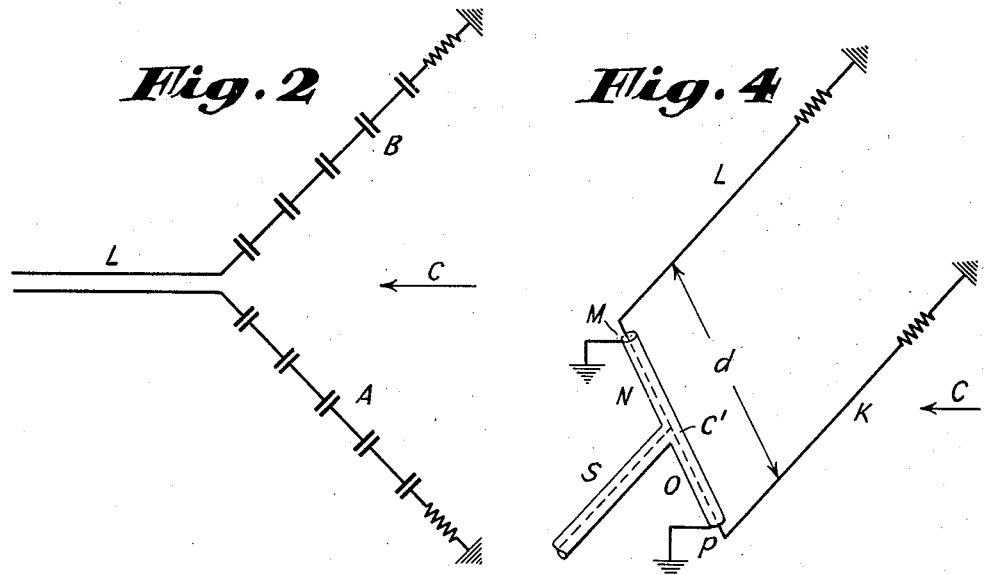
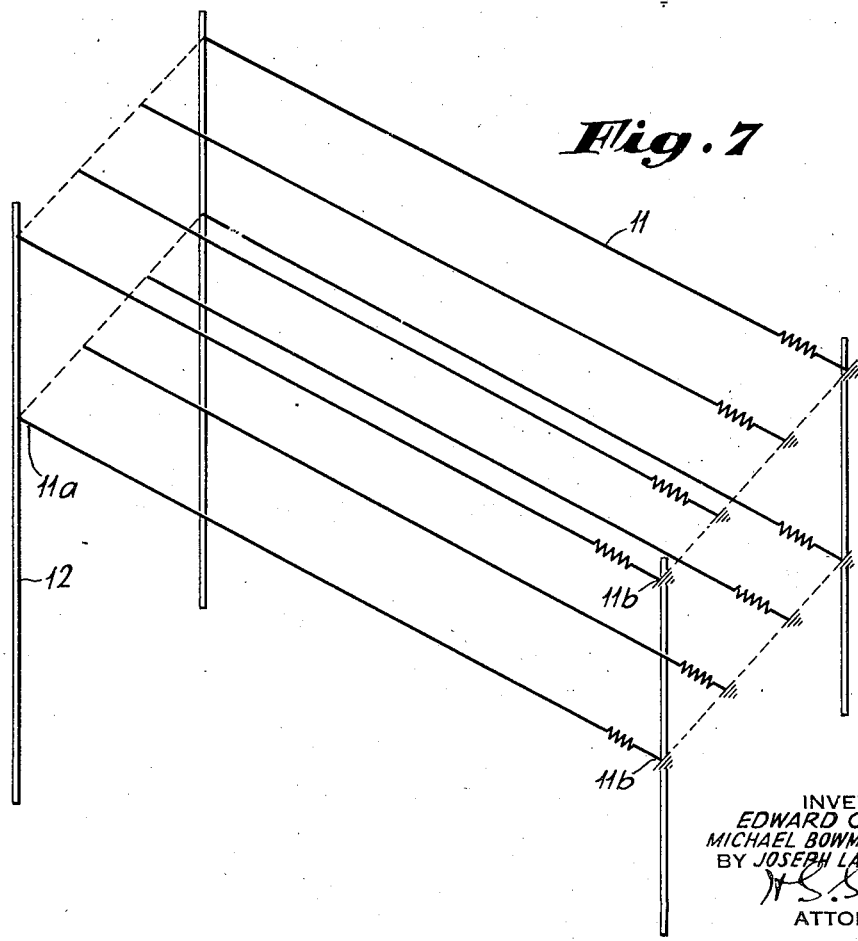
INVENTORS
EDWARD CECIL CORK
MICHAEL BOWMAN-MANIFOLD
BY JOSEPH LADE PAWSEY
ATTORNEY Patented July 23, 1940

2,208,749

UNITED STATES PATENT OFFICE 2,208,749

AERIAL SYSTEM

Edward Cecil Cork, Ealing, London, Michael Bowman-Manifold, Woking, and Joseph Lade Pawsey, Hillingdon, England, assignors to Electric & Musical Industries Limited, Hayes, Middlesex, England, a company of Great Britain Application February 3, 1938, Serial No. 188,422
In Great Britain February 9, 1937

9 Claims. (Cl. 250—33)

This invention relates to wireless aerial systems and is concerned with the provision of a unidirectional transmitting or receiving aerial for the transmission or reception of a wide band of short wave signals such as are encountered in television transmission or reception.

The usual type of aerial employed for television reception is a vertically arranged dipole, but an aerial of this kind is not altogether satisfactory owing to the tendency of these aerials to pick up interfering signals from motor vehicles and other sources of interference.

It is, therefore, the chief object of the present invention to provide an improved aerial system which is less susceptible to the pick up of interference than the known form of dipole and one which is unidirectional and has a substantially flat frequency characteristic and so is capable of receiving or transmitting a wide short wave frequency band, such as is desirable for the simultaneous transmission or reception of television and accompanying sound transmission.

If an aerial carries a traveling wave having a phase velocity greater than that of light and terminated by an impedance substantially equal to its characteristic impedance, directions exist in which the phase of the radiation from all portions of the aerial is equal. In these directions the maximum of signal transmission occurs and it is found that these directions of maximum transmission lie on a cone having its axis coincident with the axis of the aerial. Where the aerial is arranged for reception a similar cone is formed by the directions of maximum reception.

According to the main feature of the invention, the aerial system comprises an aerial conductor loaded at frequent intervals along its length with series capacities for the purpose of imparting to the transmitted or received signal a phase velocity greater than that of light. The aerial is made substantially reflectionless and tilted at such an angle above or below the horizontal that one generatrix of the cone of maximum transmission or reception as the case may be is coincident with the desired direction of propagation of the wave, or is coincident with the direction of propagation of the wave to be received. Either end of the aerial may be elevated, the feeder end of the aerial being remote from the desired transmitter in the case of reception and from the receiver or receivers to which it is desired to send signals in the case of transmission.

In the case where the aerial system in accordance with the invention is for use in the reception of signals such as television signals in which the wave to be received is vertically polarized and directly propagated, that is to say, the direction of propagation is substantially horizontal, the aerial will be so inclined that a horizontal plane is tangential to the cone of maximum transmission or reception along the ray direction of the wave to be received.

If the wave is not vertically polarized, the aerial will be disposed in the plane of polarization and at the required angle with respect to the direction of propagation.

In some cases a substantial amount of reflection of a wave may occur before it reaches the aerial and in such a case the aerial will be arranged in a plane perpendicular to the plane of the wave front.

In carrying the invention into practice it is preferred to use an aerial system comprising an aerial conductor loaded at frequent intervals along its length with series capacities, one end of the conductor being connected to a feeder while the other end is terminated so as to be substantially reflectionless by connection through an impedance to an effective earth constituted, for example, by one or more quarter wavelength conductors.

When the feeder is of the concentric type, the sheath is also preferably earthed by attachment to the mid-point of a transverse conductor of an electrical length approximately a half of a wavelength of the operating frequency. In order to match the impedance of the aerial to the impedance of the feeder, a transformer of suitable design may be connected between the aerial and conductor and the feeder.

One specific construction of aerial in accordance with the invention is represented diagrammatically in elevation and plan respectively in Figures 1A and 1B of the accompanying drawings, and a further embodiment is shown in Figure 1C.

An array may be evolved by combining a plurality of the tilted wires of Figures 1A, 1B and 1C together as shown in Figures 2, 3 and 4, which represent various arrays including aerials constructed according to the invention.

Figure 5 is a diagram showing the action of the array of Figure 4 when a signal is received, and Figure 6 is a polar diagram of the single wire aerial.

A further form of array is illustrated in the single figure Figure 7 of the accompanying drawings.

In Figure 1A 1 is an aerial conductor having an assembly overall length of about 50 to 60 feet made up of a series of lengths such as 2 assembled by insulators 3 across each of which a condenser of 50 micromicrofarads is provided connected to the adjacent ends of the lengths of the aerial, these condensers forming the series capacities aforesaid. The insulators each with its associated condenser are arranged at about 15 inches apart along the assembled aerial. The lengths of conductor 2 may be formed of No. 14 SWG copper wire. The aerial is tilted at an angle to the horizontal of about 45° and the upper end of the aerial is connected through a resistance 4 of 320 ohms to the mid-point of a vertically-disposed conductor 5 equal in length substantially to a half of the wavelength of the operating frequency which, in the case of a frequency of 45 megacycles, will be 11 feet long. This last mentioned conductor may be formed of No. 18 SWG copper wire and acts as an effective "earth point." Alternatively a coiled earthing conductor may be used as represented at 5a in Figure 1C. The coiled earthing conductor 5a has an inductance of such value that when taken with the distributed capacity of the device to earth the device resonates at the operating wave frequency. Due to the resonance the device presents a very low impedance to the antenna for the operating frequency and thus acts as an effective earthing point. The impedance of the aerial constructed as above described is about 245 ohms and the lower end of the aerial is connected through a transformer 6 to a suitable construction of feeder indicated at 7, and which may be of the usual concentric type. The lower end of the aerial 1 may be disposed about 7 feet above ground level and it is preferred to employ a "quarter wavelength" conductor for transformer 6 in order to match the impedance of the aerial to that of the feeder 7. It is known that such a quarter wave-length transformer will match a pair of unequal impedances if its own characteristic impedance is the geometric mean of the impedance to be matched. In the present specific case the feeder is composed of a lead sheath of $\tfrac{5}{16}$ inch inside diameter with a No. 18 SWG crinkled copper conductor with paper insulation. The characteristic impedance of a feeder of this kind is 105 ohms and the transformer necessary to match the impedance of the feeder to that of the aerial is composed of a concentric line a quarter wavelength long with a characteristic impedance of 170 ohms.

The sheath of the feeder 7 or the sheath of the transformer 6 is earthed at the aerial end by any suitable means, such as by arranging one or more quarter wavelength conductors thereat. Preferably, a half wavelength conductor such as 8 in Figure 1B is employed connected to the sheath of the transformer at its middle point and disposed transversely thereof. This conductor may be replaced by a coiled conductor of the type described above as shown at 8a in Figure 1C, where 9 is the wooden former.

The arrangement of Figure 1C is one which may be preferred to the arrangement of Figure 1A in some cases. In this case the end 1a of the aerial conductor 1 to which the feeder is connected through the transformer 6 is elevated in respect of the terminated end 1b. The arrangement of Figure 1C is usually effective for use for reception on a building such as a dwelling house. In this case the field strength due to a given transmitter usually increases rapidly with height so that the upper part of the aerial picks up most signal. It is thus desirable that this part of the aerial should be nearest the feeder so that the least possible amount of signal energy is dissipated in the aerial. Thus although the arrangement of Figure 1C is found to be inferior in respect of noise pick-up to the arrangement of Figures 1A and 1B, the actual signal to noise ratio may be better in the case of the arrangement of Figure 1C, due to the enhanced signal current reaching the feeder. The arrangement of Figure 1C in the case of a building, also presents a simpler problem in respect of the mounting of the aerial, owing to the fact that in this case the feeder may be led onto the roof of the building and the terminated end of the aerial connected to some lower support, for example through the guy rope 10.

With an aerial constructed as described above, it is found that the received power is about 2 decibels greater than with a known form of dipole, the center of which was at the same height as the top of the aerial, and, in addition, interference in the vicinity of the aerial, in particular from motor vehicles, is less noticeable than with the dipole. The aerial is also found to have a substantially flat frequency characteristic which is eminently suitable for the simultaneous reception of vision and sound signals from a television transmitter.

Instead of making the aerial of a series of lengths interconnected by insulators and coupled by series condenser, the required capacity may according to one feature of the invention be provided by spacing and overlapping the ends of a plurality of mutually insulated lengths of conductor arranged in succession, the degree of overlap between successive conductors affording the required capacity. In this case, the conductors may be assembled in a core of insulating material serving to hold the conductors in the required relative positions, the core being surrounded by a suitable sheath which may serve to suspend the aerial when in use to relieve the actual conductors from tension. In another form of this construction of aerial, two or more conductors may be twisted together, if desired, about one or more lengths of cord or string, the conductors being severed alternately at frequent intervals along their lengths so that, in effect, overlapping of a series of lengths occurs as in the previous example of this kind of aerial. The twisted conductors may be contained in a core of insulating material surrounded by a suitable sheath. Both conductors must be mutually insulated; for example the conductors may be enamelled or cotton covered.

The array shown in Figure 2 comprises two balanced tilted aerials A and B center fed from a two wire transmission line L. The arrow indicates the direction of arrival for optimum reception. The plane of polarization of the electric vector of the received wave is the plane of the paper.

Figure 3 of the drawings shows an "end fire" array comprising three tilted loaded aerial wires D, E and F. The wires are separated by a distance $d$ and arrangements are made in the transmission lines H and I to delay the phase of the signals from the aerial E and F to give addition at the point of junction of the three feeders in equal phase for signals arriving from the desired direction.

Figure 4 is a diagrammatic perspective view of a preferred arrangement. This comprises two spaced tilted wires L and K forming a broadside tilted array arranged in a plane at right-angles to the plane of the paper which is assumed to be vertical. The wires are spaced a distance $d$ apart and are separately fed in phase from quarter wave transformers MN and OP respectively which transform the aerial impedance to $2Z_0$.

The main feeder which has an impedance $Z_0$ divided at the point C into two branches each of impedance $2Z_0$ and of equal length. These are joined to the ends of the quarter wavelength transformers MN and OP so that the system is correctly matched.

In Figure 5 M and P represent the lower ends of the aerials L and K of Figure 4 separated by the distance MP equal to $d$. QM indicates the direction of a received plane wave for maximum response and RP represents a plane wave arriving at the array from a direction inclined at an angle $\theta$ to the direction QM, RM is perpendicular to the advancing wave front RP and consequently is parallel to the direction of travel of the wave.

If
$$RM = d \sin \theta = \frac{\lambda}{2}$$
then the signals received in the two aerials will tend to cancel each other, and the reception will be a minimum, but if $d \sin \theta = \lambda$ the signal reception will reach a second maximum. By utilizing these properties it is possible to improve the directive properties of the aerial.

For example, the full curve of Figure 6 represents approximately the horizontal diagram for a single tilted wire aerial, the radius from T representing the signal strength. The maximum response from the wire is obtained when the incoming wave is arriving from a direction V with the tilted wire in the plane of polarization. If the separation of the aerial wires in the array of Figure 4 is arranged so that a minimum of reception appears for signals arriving from a direction such as X and X', then the range about the line TV over which strong signals can be obtained will be reduced.

For example if the spacing be chosen at three-quarters of a wave length, the minimum response due to the spacing of the wires will occur when the direction of the incoming wave is inclined at 42° to the direction of maximum response of the individual wires. There is no inclination of the wave direction for complete reinforcement due to a path difference of one wave length, but in the region of 80° to 90° there is partial reinforcement, as shown by the lines TY and TY' in Figure 6. However, the responses from the individual wires in this region are small so that the directivity of the array will not be seriously affected by the occurrence of such a maximum.

The array shown in Figure 7 consists of eight tilted wires such as 11 arranged on suitable supports such as 12, each wire is fed at its top end such as 11a and terminated at the bottom 11b. This arrangement may, in some circumstances, give in the presence of the earth, slightly more gain as explained in connection with Figure 1C. The wires are arranged in two horizontal rows of four, the horizontal separation between adjacent aerials in each row being approximately $1/2\lambda$ or $3/4\lambda$, the rows being separated by a vertical distance of $\lambda/2$ approximately.

Each aerial wire is connected through a $\lambda/4$ matching transformer to a feeder of characteristic impedance 140Ω the eight feeders being made equal in length and connected in parallel and the resulting impedance of
$$\frac{140}{8} \Omega$$
transformed by a $\lambda/4$ transformer to the characteristic impedance of the main feeders. The feeder arrangements are not shown.

This array is found to have a gain relative to a $\lambda/2$ dipole at the mean height of the array of 5 or 6 volts.

While the invention has been described primarily with reference to the reception of signals, it will of course be appreciated that an aerial in accordance therewith may be used just as well in the transmission of signals.

Having now particularly described and ascertained the nature of our said invention and in what manner the same is to be performed, we declare that what we claim is:

1. An aerial system comprising an aerial conductor loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto.

2. An aerial system comprising an aerial conductor having a length at least as long as the length of the operating wave and loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto.

3. An aerial system comprising an aerial conductor having a length at least as long as the length of the operating wave and loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto, and means connected to the other end of said aerial for preventing reflection.

4. An aerial system comprising an aerial conductor having a length at least as long as the length of the operating wave and loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto, and means connected to the other end of said aerial for preventing reflection, said means comprising a series impedance connected between said conductor and an effective earth.

5. An aerial system comprising an aerial conductor having a length at least as long as the length of the operating wave and loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto, and means connected to the other end of said aerial for preventing reflection, said means comprising a series impedance connected between said conductor and an end of a plurality of conductors, each conductor having a length equal to a quarter of the length of the operating wave.

6. An aerial system comprising an aerial conductor having a length at least as long as the length of the operating wave and loaded at frequent intervals along its length with a series of capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto, and means connected to the other end of said aerial for preventing reflection, said means comprising a series impedance connected between said feeder and the midpoint of a transverse conductor having an electric length equal to a half the length of the operating wave.

7. An aerial system comprising an aerial conductor having a length at least as long as the length of the operating wave, and formed of a plurality of relatively short lengths of conductors arranged with their ends overlapping whereby the overlapping ends provide a plurality of series capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto.

8. An aerial system comprising an aerial conductor having a length at least as long as the length of the operating wave, and formed of a plurality of relatively short lengths of conductors arranged with their ends overlapping whereby the overlapping ends provide a plurality of series capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto and means connected to the other end of said aerial for preventing reflection.

9. An aerial system comprising an aerial conductor having a length at least as long as the length of the operating wave, and formed of a plurality of relatively short lengths of conductors arranged with their ends overlapping whereby the overlapping ends provide a plurality of series capacities for the purpose of imparting to the received signal a phase velocity greater than that of light, said conductor being tilted at such an angle below the horizontal that an upper generatrix of the hollow cone of maximum reception is coincident with the desired direction of propagation of a wave to be received, the end of said aerial remote from the source of said wave having a feeder connected thereto and means connected to the other end of said aerial for preventing reflection, said means comprising a series impedance connected between said conductor and an effective earth.

EDWARD CECIL CORK.
MICHAEL BOWMAN-MANIFOLD.
JOSEPH LADE PAWSEY.